_United States Patent Office_

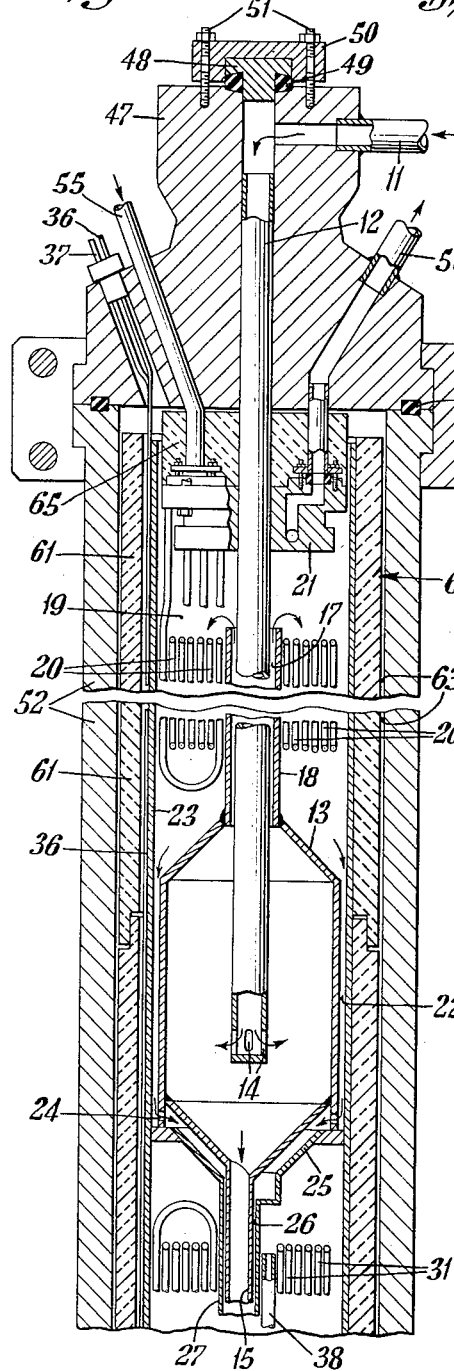

2,784,148
Patented Mar. 5, 1957

2,784,148

METHOD AND APPARATUS FOR SEPARATING COAL HYDROGENATION PRODUCTS

Radcliffe G. Edmonds, Charleston, and Edward W. Doughty, South Charleston, W. Va., assignors to Union Carbide and Carbon Corporation, a corporation of New York Application November 12, 1953, Serial No. 391,554

18 Claims. (Cl. 196—94)

This invention relates to a method and apparatus for effecting a primary separation and initial cooling of the products from a coal hydrogenation reaction.

These products of the coal hydrogenation reaction are diverse in character and comprise non-condensable gases, light and heavy oils, pitch, unreacted coal, and ash, the molecular weights of the individual constituents, for instance, being with the range of from 2 to more than 1000. The product mixture leaves the hydrogenation reactor at a high temperature, usually between 450° and 500° C., and under a pressure of from 2500 to 6000 pounds per square inch gauge. It is necessary, before further processing and refining, to separate the non-condensable gases and lighter oil constituents of the product mixture from the heavier oils, pitch, ash and unreacted coal.

In addition to this separation, it is also necessary to cool the products partially prior to further processing. To obtain economy and efficiency in the complete hydrogenation process, it is preferable that the heat given up at a high temperature level by the products in cooling be utilized fully and not wasted. Another requirement of any successful and desirable separation procedure arises from the nature of the products themselves. Handling pitch and unreacted coal under conditions of high temperature and pressure involves an ever present danger of coking and hence of fouling of the apparatus. Therefore, it is essential that the separation and cooling be accomplished as rapidly as possible and without fouling of the cooling surfaces due to the accumulation of solids.

The high temperatures and pressures, and the large volumes of materials to be handled impose still another restriction on the method and apparatus to be used. The special alloys and other construction features necessary because of the high temperatures and pressures add greatly to the expense of any such apparatus, and therefore, it is essential that the size and number of component units of such an apparatus be kept to a minimum and be compactly arranged within a pressure vessel.

The problem of efficiently separating and cooling such a mixture is a relatively new one. Prior developments include those in Germany during and prior to World War II (see Fiat Final Report 952, published by the Field Information Agency, Technical, of the U. S. Department of Commerce) and the work on coal hydrogenation done by the U. S. Bureau of Mines.

In contrast to the bulky and multiple units heretofore employed, the apparatus employed in our improvement comprises a compact single vessel wherein the product mixture from the reactor is both cooled and separated into a light and a heavy component, in an efficient manner and with maximum recovery of the heat from the cooling of the product. As used herein, the light and heavy components refer to the more and less volatile products respectively.

Our improvement comprises essentially two separation steps. Integral with these steps are two stages of cooling of the products. As the primary separation step, the light and heavy phase products are subjected to a gravity separation wherein light phase is removed as a vapor. These light phase vapors are then condensed, and the condensate and non-condensible gases are cooled, by condensing on and passing over a set of coils through which a cooling fluid is circulated. The cooled condensate and the gases are then recombined with the heavy phase, in a part of the vessel called the sump. The second separation step occurs when the cooled condensate is mixed with the liquid and solid heavy phase from the primary separation in the sump. The hot heavy phase liquids and solids are quenched rapidly upon entering the cooler sump material. Flash vaporization of the light phase condensate then occurs upon mixing with the heavy phase, which separates the light and heavy phases again at a new and lower temperature, and cools the sump to which the hot heavy phase from the primary separation is being constantly fed. The light phase vapors thus formed are passed over a secondary set of coils containing a cooling fluid and the less volatile portion of these vapors is recondensed on this secondary set of coils to be conducted back to the sump. The portion of the light phase vapors not recondensed, together with the light phase gases, is conducted away as light phase product, while heavy phase product is continually drawn off from the sump.

Our preferred vessel for carrying out the steps described above comprises a closed upright cylindrical vessel, divided into two separation areas. At the top of the vessel are primary cooling coils with connections into and out of the vessel for cooling fluid. Below these coils is a primary separation area, a closed separation chamber. A conduit from outside the vessel leads into this chamber. An exit from the chamber leads over the primary cooling coils; another exit leads down into the sump area. In a lower part of the vessel is a secondary separation area, and a secondary set of cooling coils, with connections out of the vessel, located between the two separation areas. Conduits from the area around the primary cooling coils and from the separation chamber of the primary separation area lead into the secondary separation area. There is an exit conduit from the sump of the secondary separation area, and another exit means leading from the area above the secondary cooling coils. Preferably, the vessel is provided with a removable inner shell within the vessel. The space between the inner liner and the inside wall of the vessel is kept purged with hydrogen to prevent the accumulation of condensed material on the colder wall of the outer vessel.

In the drawing:

Fig. 1 is a fragmentary vertical section of the upper portion and Fig. 2 is a vertical section of the lower portion of an apparatus illustrating the invention.

The product mixture from the reactor, usually at a temperature of from 425° C. to 525° C., and a pressure of 2500 to 6000 pounds per square inch gauge, enters the separator at the top through an inlet pipe 11. The mixture then flows down the separator through a lead-in pipe 12. The mixture is released into a primary separation area, a separation chamber 13, through lateral exit ports 14 at the outlet end of the lead-in pipe 12. At this point, due to a large reduction in velocity, primary separation of the product mixture occurs by gravity. The heavy liquid phase, comprising essentially the heavier oils, the pitch, the ash, and the unreacted coal, falls as a slurry directly to the bottom of the chamber 13 and then down through a connecting pipe 15 into the bottom of the secondary separation area, called the sump 16.

The lighter vapor phase components of the product mixture emerging from the ports 14, including the non-condensed gases, the condensable gases in the gaseous state, and the volatilized lighter oils, all flow upward by and out of the chamber 13 through an annular space 17 between the pipes 12 and 18. Such gases and vapors emerge into a space 19 above primary cooling coils 20, and are deflected downwardly over such coils. At this point, initial cooling, condensation, and heat exchange occur. The coils 20, which are designed to give maximum contact surface within the space allotted to the coils, with no opportunity for the gases to by-pass the coils, are preferably so situated that the cooling fluid enters the coils from the manifold 21 at the bottom of the coil space and follows a rising helical path through the parallel sets of coils, leaving the coils at the top thereof through another part of the manifold 21. Thus, the flow of the cooling fluid upwardly counters the flow downwardly of the hot gases and vapors, thereby achieving maximum efficiency of heat transfer.

The cooling fluid (gas or liquid) used in the primary coils may be any suitable material, including hydrogen, oil or water. In our operation of the apparatus of the invention, we prefer to use hydrogen for the following reasons. In the overall process of coal hydrogenation, hydrogen at high pressure and elevated temperature is required. When hydrogen is used as the cooling fluid in the apparatus of the invention, it leaves the apparatus at high pressure and elevated temperature and thus is available to fill the need elsewhere in the coal hydrogenation process and eliminates the necessity for additional heating apparatus to provide this heated hydrogen. The hydrogen used should be at least 80 percent pure.

In addition to this general economic advantage, hydrogen has specific properties which make it highly desirable as the cooling fluid in this part of the apparatus. Hydrogen at high pressure has a film heat transfer coefficient even higher than the condensing oils which form on the coils 20 and therefore a large heat flux is obtained with a small temperature driving force. Hydrogen has the further advantage of being clean and non-gumming, which prolongs the life and efficiency of the cooling coils.

Under normal operation, the quantity of hydrogen passed through the primary cooling coils 20 is fixed according to the quantity of condensable vapors in the reactor product received into the separator. The quantity of these vapors present controls the amount of heat at any temperature level which can be recovered by the hydrogen, and hence only the quantity of hydrogen necessary to absorb this amount of heat is passed through the coils. The quantity of condensable vapors present will vary with the reactor feed rate, the degree of reaction in the reactor, the temperature in the reactor, and other related factors.

Condensate formed on the outside surface of the coils drips downwardly, and it, together with the noncondensable gases and the uncondensed vapors, flows downwardly through an annular space 22 between the separation chamber 13 and the inner vessel shell 23, then through ports 24 and into a cone 25 which isolates the upper or primary separation area of the inner vessel from the lower or secondary separation area, and which is located directly below the conical bottom of the separation chamber 13. From the cone 25, the condensate, gases, and vapors flow down through an annular space 26 between a separator shell exit pipe 15 and a pipe 27, emerging at an exit 28 into the sump 16. The final temperature of this condensate dripping down from the coils is usually about 300° C.

The area inside the vessel shell 23 and below the cone 25 constitutes a lower separation zone, including the sump 16, where further separation and cooling of the material occurs. The liquid in the sump 16 consists mainly of the heavy phase, including the heavier oils, pitch, ash, and unreacted coal, with the major portion of the light phase which is continuously entering the sump being constantly expelled to the vapor phase, as will be shown.

The temperature of the liquid in the sump 16 is normally between 320° C. and 400° C., as compared to the 425° C. to 525° C. temperature of the product mixture entering the separation vessel. The liquid in the sump 16 is continually replenished from two sources. One source is the heavy phase separated out in the separation chamber 13 from the reactor products mixture entering the separator. This material, normally at a temperature of 425° C. to 525° C., falls down through the pipe 15 and is delivered into the sump 16 through an exit port 29, which is well below the normal liquid level 30 in the sump. The other source of material to the sump 16 is condensate flowing downward from both the primary and secondary coils 20 and 31. As previously described, the condensate from the primary coils 20 together with the noncondensable gases, flows into the sump 16 through an annular pipe space 26, emerging through exit port 28 to flow downwardly over the lower manifold 32 into the sump 16. The condensate from the lower coils 31 also flows downwardly past the lower manifold 32 into the sump 16.

While the liquid in the sump is constantly being replenished as just described, the level is maintained by the flash vaporization of light phase material out of the sump and by the constant withdrawal of heavy product from the bottom of the sump 16 through a heavy phase exit pipe 33. The liquid level is measured by a suitable mechanical or thermal means. In the apparatus shown in the drawing, the level is determined by the differential pressure within the apparatus. This is measured at nozzles 34 and 35 which are connected through tubes 36 and 37 to a recorder outside the apparatus. Other suitable means such as thermocouples could also be employed.

As described above, the heavy material from the first separation falls into the sump through exit 29 at a temperature usually from 50° to 180° C. above the temperature of the sump. As this hot material enters the sump 16, it is quickly quenched, and the heat removed causes a rapid flash volatilization of the light material condensate which has fallen into the sump. This flashing of the light materials cools the sump, maintaining its temperature at 50° to 180° C. below the temperature of the hot materials falling into it. This cooling of the heavy fraction by flashing off the light fraction eliminates the necessity for passing and repassing the heavy fraction over cooling coils, with resultant deterioration of the heat transfer coefficient, and constitutes an important advantage over the prior art.

The vapors which have been volatilized by flashing from the sump 16, together with the non-condensable gases and the uncondensed oil vapors emerging from the exit 28, flow upwardly, passing over the secondary cooling coils 31. In passing over these coils, some of the vapors are condensed thereon and fall back into the sump. Those vapors which are not condensed on the secondary coils 31, together with the non-condensable gases, are deflected by a cone 25 above the coils 31 and flow down an exit pipe 38 into an annular space 39 located between a conical bottom 40 of the inner vessel and a collecting funnel 41 which covers an insulating filler member 42. The vapors, together with the non-condensable gases, flow downward through an annular space 43 between the sump exit pipe 33 and a liner pipe 44 and into an outlet in a bottom cap 45 leading to a lateral exhaust pipe 46. The heavy phase product from the sump is continuously withdrawn through exit pipe 33.

The construction of the secondary coils 31 is generally similar to that of the primary coils 20, and these secondary coils 31 are attached to a lower manifold 32. Like the primary coils, these secondary coils could be cooled by any one of a number of suitable fluids. In our practice of the invention, all the heated hydrogen necessary for use elsewhere in the coal hydrogenation process is available from the hydrogen used as the cooling fluid in the primary coils 20. Therefore, we have tried and found water of boiler feed purity to be very satisfactory as the cooling fluid for the secondary coils 31, inasmuch as it is clean and does not clog the coils, and the high pressure steam which results is useful elsewhere. However, hydrogen would be equally suitable in these secondary coils.

The temperature control affected by varying the quantity of cooling fluid put through the secondary cooling coils is very important to the operation of the entire separator apparatus. The flow rate and temperature of the water or other cooling fluid put through these coils through control of the vapor temperature determines the rate at which light phase vapor will be condensed on these coils to flow back into the sump, and thereby controls the degree of rectification of the vapors making up the light phase removed from the separator through the exit pipe 38. This flow rate also indirectly controls the temperature of the liquid in the sump 16 inasmuch as this temperature and the rate of reflux in the lower separation area are interdependent and vary with one another during normal operation of the process.

Thus, during normal operation of the process, where the temperature and flow rate of the cooling fluid put through the primary coils 20 is held at a fixed value determined by nature of the hydrogenation product received into the separator and the operating variables in the reactor affecting it, the flow rate of the cooling fluid through the secondary coils 31 is the only control variable in the separation process, and affords the sole means of controlling the composition of the products removed from the separator. For certain conditions, however, further control through varying the flow rate of the cooling fluid through the primary coils 20 is possible, as will be discussed later.

The refluxing and rectifying of the light phase in the lower separation area is an important advantage of the process, because it produces a light phase product which is exceptionally free of heavy polymer-forming contaminants, as shown in the table below. This is possible because in the lower separation area, the equilibrium temperature is from 120° C. to 260° C. lower than in the separation chamber 13, and thus the light phase produced in the secondary separation area is much lighter than the light phase originally separated in the separation chamber 13 from the original reactor product entering the separator. A relatively pure light phase product leaving the separator is important because any attempts to remove heavy phase so as to further refine the light phase, after it has left the separator, would involve complex distillation equipment and loss of material.

The heavy phase product removed from the separator does have some light phase present, but this can be conveniently removed elsewhere in conventional low pressure stills and its presence is actually in advantage in that it makes the heavy product more fluid and hence more easily pumped and handled. On the other hand, if desired, it is possible to strip the light phase more completely from the heavy product by raising the temperature in the sump or by introducing hydrogen directly into the separator interior for this purpose, as is necessary in the German process. In the preferred operation of the invention, however, this is not done.

The degree of control afforded by varying the cooling fluid flow rate through the secondary coils, as just described, is sufficient for all normal operation. It is, however, an important advantage of the process that, should either the nature of the materials entering the separator or of the product it were desired to remove from the separator demand it, a much greater degree of control is available. This is possible through varying the flow of cooling fluid through the primary coils 20 as well as through the secondary coils 31. When this is done, the interdependency between the rate of reflux in the secondary separation area and the temperature of the liquid in the sump no longer exists, and it is possible to vary the two independently. Increasing or decreasing the flow rate of the cooling fluid through primary coils will result in more or less cooled condensate falling into the sump mixture from these primary coils and thus will change its temperature without altering the degree of reflux in the secondary separation area. While not normally used, this dual control is essential for some types of operation.

The foregoing completes the description of the flow of the reactor product through the separator apparatus. The following are details of the apparatus construction as embodied in the apparatus shown in the drawing. At the top of the separator, a cleaning hole, which is in line with the lead-in pipe 12 is provided in the top cap 47. During operation, this hole is closed with a plug 48, which is sealed with a suitable gasket 49 and held on by a cover plate 50 which is secured to the top cap 47 with bolts 51. A seal is effected between the two caps 47 and 45, and the body 52, by a suitable pressure-sealing gasket 53 and the caps are secured to the separator body 52 with segmented circular clamping rings 54. This construction permits rapid installation or removal of the caps, a feature lacking in conventional bolted closures. All pipes leading into and out of the separator apparatus are joined to it with suitable high-pressure gasket seals.

Cooling fluid for the top coils 20 is supplied through an inlet pipe 55 to dual upper manifold 21, from which it is lead through pipes to the bottom of the coils 20 in order that it may flow upward through the coil area, the fluid then returning to another passage in dual upper manifold 21 and leaving the manifold and the separator through an exit pipe 56. An insulating filler 65 separates the dual upper manifold 21 from the top cap 47. The importance of designing the coils so that they fill the coil space and prevent by-passing of the coils by the vapors, and also providing that the cooling fluid flows upward through the coils, counter-current to the vapors coming down, has been pointed out above.

The secondary cooling coils are constructed similarly to the primary coils just described. Cooling fluids come in through an inlet pipe 57 and flow up to a dual lower manifold 32 through a pipe 58. The fluid is then introduced at the bottom of the coils, flowing upward through the coils concurrent with the upward flow of the vapors across the coils but counter-current to the downward falling condensate. The spent cooling fluid is conducted back to a different passage in the dual lower manifold 32 then down through a pipe 59 to a cooling fluid exit pipe 60. It is essential to the design of these coils that the spacing of them permit the simultaneous counter-current passage of reflux liquid and vapors, as in a packed still column. Failure to do so would result in flooding of the separator and consequent loss of rectifying efficacy.

Due to the hydrogen content of the reactor product, there is in the practice of the invention, as with the use of any apparatus where hydrogen comes in contact with metal at high pressures and temperatures, a serious problem of hydrogen attack on the metal structure. This could be solved by making the vessel itself of a highly corrosion-resistant metal and the invention would work quite well. Such a procedure, however, would be difficult and expensive, and once corroded, the entire vessel shell would be impaired. We have solved this dual problem by providing a thin inner shell 23, of highly corrosion-resistant metal wrapped with an insulation 61 composed of laminated glass cloth and metal foil encased in a metal cover, to form an integral cylindrical unit 62 which fits loosely within the outer wall of a cylindrical vessel 52, leaving an annular space 63. The inner unit 62 can be easily removed for cleaning or replacement by merely removing a top cap 47 and a bottom cap 45 from the vessel 52.

Such annular space 63 is connected at the top to the interior area of the vessel so as to equalize pressure and so, if suitable precautions were not taken, reactor product would collect therein, condensing on the walls and eventually filling the space, thereby making it difficult to remove the unit 62. Therefore, the space 63 is continuously swept with hydrogen in order to prevent any material from entering. This hydrogen is introduced by a conduit 64 through the bottom cap 45 and flows upward through the annular space 63. At the top of the inner unit 62, it diffuses over into the inner vessel space 19 and there mixes with the process stream, eventually flowing down through the annular space 22 as part of the light phase.

Many advantages resulting from our improved method and apparatus can be seen from the above description, and some of them will be described more fully. The cooling of the sump liquid by the vaporization of a light condensate obviates the distinct disadvantages of externally cooling the sump liquid by indirect heat exchange with hydrogen, oil, paste, or air, methods in which there is continual danger of fouling the cooling coils. Cooling the sump by our method of vaporizing a light liquid reflux, supplied by condensation of this clean vapor, is much to be preferred. All of the heat exchange surfaces can be maintained continuously effective, inasmuch as heating and cooling are restricted to clean fluids rather than to heavy liquids and slurries as in prior methods. In addition to freedom from fouling, a further advantage accrues from the use of fluids having unusually high fluid heat transfer coefficients, as is the case with evaporating and condensing fluids and with high mass velocity hydrogen. This reduces the area and temperature driving force required to a minimum, so as to permit a compact and economical design.

The cooling coils are so utilized in condensing the vapors that the potentially valuable high temperature level sensible and latent heat of the reactor product entering the separator is recovered to a far greater extent by heat exchange with the preferred cooling fluids, hydrogen and water, than has heretofore been possible. Furthermore, hydrogen and steam are made available from the separator at pressures up to 6000 pounds per square inch and at temperatures of from 300° C. to 525° C. for use elsewhere in the coal hydrogenation process. Full ultilization of the heat available from the process is thus made possible. Were conventional heat transfer fluids used as coolants, the heat would be utilized only after another transfer in an additional heat transfer apparatus. This would require the construction of expensive apparatus and there would be a loss of heat in the additional transfer.

The quick quenching of the heavy phase of the reactor product while still at reactor pressure as it is dumped directly from the separation chamber down into the cooler sump results in much greater protection against coking than is obtained with the large, liquid holdup of heavy product at the higher temperature encountered in the prior art. Such an apparatus was operated experimentally many months without the formation of any coke deposits. This renders unnecessary additional measures against coking, such as, for example, the introduction of up to 35 percent of all fresh hydrogen as practiced in some of the prior art.

Another important advantage is that a greatly enriched light vapor product is produced. Former methods resulted in the inclusion of substantial quantities of an oil fraction boiling above 325° C. in this light vapor product, causing foaming and poor liquid-vapor separation. To reduce this tendency as encountered in the older methods, it was necessary to recycle a stream of light naphtha, about 20 percent by weight, which was injected together with water into the entrance of the vapor cooler. In the operation of our invention, no such difficulty is encountered, and it is unnecessary to use any recycled naphtha.

The greater efficiency and higher quality light vapor product obtained in the practice of our invention is manifested by a comparison of the ASTM distillation characteristics of the light product from our apparatus when operating at a pressure of 4000 pounds per square inch and the relatively low sump temperature of 320° C., with those from the German and U. S. Bureau of Mines apparatus. At 300° C. and atmospheric pressure 76 percent by weight of our light vapor product can be distilled over while only 33 percent by weight of the Bureau of Mines light product and 37 percent by weight of the German product can be distilled off at this temperature. For comparison see Bureau of Mines Report of Investigations 4770, "Synthetic Liquid Fuels—Annual Report of the Secretary of the Interior for 1950, Part I, Oil From Coal," pages 1 to 5, particularly Table 2 on page 4.

The following table shows ASTM distillation data for typical samples of light and heavy product from the apparatus of the invention. In each case, the material withdrawn from the separator has been flashed to 5 pounds per square inch pressure, from a pressure of 4,000 pounds per square inch, thereby removing some of the volatile material and dissolved gases from the analysis.

*ASTM distillation data*

|  | Heavy Product | Light Product |
| --- | --- | --- |
| Initial Boiling Point | 207° C | 67° C |
| Percent by weight distilled: |  |  |
| 5 | 319° C | 88° C |
| 10 | 337° C | 94° C |
| 20 | 368° C | 171° C |
| 30 | 377° C | 196° C |
| 40 |  | 213° C |
| 50 |  | 228° C |
| 60 |  | 249° C |
| 70 |  | 283° C |
| 80 |  | 317° C |
| 90 |  | 351° C |
| End Point | 33 percent at 380° C | 94% at 377° C |

What is claimed is:
1. A continuous process for separating the light vapor phase and heavy liquid phase hot products of a coal hydrogenation reaction which comprises: as a primary separation step, separating said light vapor phase and heavy liquid phase products by gravity, conducting said heavy liquid phase to a sump mixture, condensing a portion of said light phase vapors by cooling the vapors and the condensate as formed; as a second separation step, recombining the condensate of said light phase with said heavy liquid phase in said sump mixture and cooling said heavy phase by the flash vaporization of said cooled condensate of said light phase from said heavy phase, thereby reseparating said light and heavy phases, said flash vaporization resulting from said recombination of said condensate of said light phase with said heavy phase, whereby said heavy phase is quenched and cooled by transferring to said condensate in said sump the heat necessary to revaporize said condensate, continuously condensing a portion of the revaporized light phase vapors resulting from said flash vaporization and of the noncondensed vapors from said primary separation step and returning the second condensate thus formed to said sump mixture for further volatilization; continuously removing as one product that portion of the light phase vapors not condensed to form said second condensate; and continuously removing as another product the cooled heavy liquid phase resulting from said second separation step.

2. A process according to claim 1 wherein said primary separation step comprises releasing the hot products of a coal hydrogenation process into a vessel, whereby said gravity separation of said heavy liquid and light vapor phases occurs, collecting the light vapor phase thus separated, condensing a portion of said vapors by passing said vapors and the condensate as formed over a primary set of cooling coils while circulating a cooling fluid through said coils in a direction countercurrent to the direction of flow of said vapors and condensate over said primary coils, and collecting said condensate and noncondensed vapors after said condensation and cooling.

3. A process according to claim 2 wherein the temperature of said sump mixture is varied independently of the rate of condensation during the second separation step, by varying the degree of condensation of the light phase vapor on said primary cooling coils through changing the flow rate of cooling fluid through said primary cooling coils.

4. A process according to claim 2 wherein the heat transferred to the cooling fluid during the condensation and cooling of said primary separation step is utilized by employing hydrogen as the cooling fluid and thereby preheating a hydrogen feed stream for said coal hydrogenation reaction process.

5. In a continuous process for the cooling and separation of the products of a coal hydrogenation reaction wherein light vapor phase products and heavy liquid phase products are separated in a primary cooling and separation step which includes condensing a portion of the light phase vapors to form a condensate, recombined and again separated in a secondary cooling and separation step, the improvement which comprises effecting said second cooling and separation step by recombining said light phase condensate with said hot heavy phase in a sump wherein flash vaporization of said light phase condensate resulting in cooling of said heavy liquid phase occurs; collecting the light phase vapors thus produced and passing said vapors together with the noncondensed portion of the light phase vapors from said primary separation step over a set of secondary cooling coils; circulating a cooling fluid through said secondary coils in a direction concurrent with the direction of flow of said vapors over said coils; condensing and cooling at least a portion of said light phase vapors on said coils; and returning the condensate thus formed to said sump.

6. In a continuous process for the separation and cooling of the hot products of a coal hydrogenation reaction wherein light liquid phase products and heavy liquid phase products are separated and cooled in a primary separation and cooling step, the improvement which comprises: effecting said primary separation by gravity, collecting the vapor phase thus separated, condensing a portion of said vapors by passing said vapors and the condensate as formed over heat exchange coils, circulating a cooling fluid through said coils in a direction countercurrent to the direction of flow of said vapors and condensate over said coils, and collecting said condensate and non-condensed vapors after said condensation and cooling.

7. In a coal hydrogenation process wherein hydrogen at high pressures and high temperatures is required and wherein vapor phase products initially separated from the coal hydrogenation reaction products are condensed and cooled by heat exchange with a cooling fluid, the improvement which comprises using hydrogen as said cooling fluid.

8. A process according to claim 1 wherein said second separation step comprises separately conducting said hot heavy liquid phase and said light phase condensate into said sump mixture, said noncondensed light phase vapors being conducted with said light phase condensate to the area immediately above said sump mixture, the influx of said hot heavy liquid phase into the relatively cooler sump mixture resulting in flash vaporization of said light phase condensate from said sump mixture, whereby said heavy phase is quenched and cooled by transferring to said light phase condensate in said sump mixture the heat necessary to revaporize said condensate, collecting the light phase vapors thus produced and passing said vapors together with said noncondensed vapors from said primary separation step over a set of secondary cooling coils, condensing and cooling at least a portion of said light phase vapors on said coils and returning the cooled second condensate thus formed to said sump mixture, circulating a cooling fluid through said secondary cooling coils in a direction concurrent with the direction of flow of said vapors and countercurrent to the direction of flow of said condensate over said coils, collecting and removing as one product the light phase vapors not condensed on said coils to form said second condensate and continuously removing said cooled heavy phase from said sump mixture as another product.

9. A process according to claim 8 wherein the rate of cooling and condensation in said primary step is constant and the temperature of said sump mixture varies with the rate at which light phase vapors are condensed on said secondary coils during said second separation and returned therefrom to said sump mixture, this condensation rate being determined by changing the flow rate of the cooling fluid circulated through said secondary coils during said second separation step.

10. A process according to claim 8 wherein the temperature and composition of the light and heavy phase products, as removed from the apparatus, are determined by the rate at which light phase vapors are condensed on said secondary coils during said second separation and returned therefrom to said sump mixture, this condensation rate being regulated by changing the flow rate and initial temperature of the cooling fluid circulated through said coils during said second separation step.

11. A process for further cooling and separating the light and heavy phase products of a coal hydrogenation reaction, after a primary separation into a cooled light phase condensate together with uncondensed light phase vapors and a hot heavy liquid phase has been effected, which comprises recombining said light phase condensate with said liquid phase in a sump mixture, recondensing over cooling coils, to cause reflux which gives partial rectification due to liquid-vapor countercurrent contact on the surface of said coils, at least a portion of the light phase vapors formed by flash vaporization of said light phase condensate from said sump mixture when said recombination occurs and a portion of the uncondensed vapors from said primary separation step, returning to said sump mixture the second condensate thus formed, removing as light phase product that portion of said light phase vapor which has not been recondensed on said coils, said light phase product being substantially free of heavy phase contaminate, and continuously removing heavy liquid phase from said sump mixture as heavy product.

12. A process according to claim 8 wherein said cooling fluid is water of at least boiler-feed purity.

13. In a continuous process for the cooling and separation of the products of a coal hydrogenation wherein as a final separation step light phase condensate is vaporized from a sump mixture of light phase vapors and heavy phase liquids and solids, a portion of the light vapors thus produced are condensed over a set of cooling coils and returned to said mixture, the remainder of said vapors are removed as light phase product, and heavy phase product is drawn off from said sump mixture, the improvement which comprises controlling the temperature and composition of the light and heavy phase products of the process by regulating the degree of reflux and rectification of said light phase vapors from said mixture through control of the rate of condensation of said light phase vapors on said coils, said control of the rate of condensation being effected by varying the flow rate and initial temperature of the cooling fluid circulated through said coils.

14. In a continuous process for the cooling and separation of the products of a coal hydrogenation wherein cooling and condensation of light phase vapors is effected by passing said vapors over a set of cooling coils, the improvement which comprises using water of at least boiler-feed purity as a cooling fluid in said coils, whereby a supply of high temperature, high pressure steam is provided.

15. An apparatus for separating and cooling the light and heavy phases of the product of a coal hydrogenation process comprising a cylindrical vessel having a product inlet means, separate exit means for light vapor phase and heavy liquid phase product, and separate inlet and exit means for cooling fluids; said vessel containing a primary separation chamber; conduit means connecting said chamber to said product inlet means; primary cooling means for light phase vapors leaving said chamber; a secondary separation area; conduit means connecting the area below said primary cooling means with said secondary separation area, conduit means connecting said secondary separation area with said primary separation chamber; means for cooling and condensing at least a portion of light vapor phase vapors leaving said secondary separation area and for returning the as-formed condensate to said secondary separation area; conduit means for conveying the uncondensed portion of the light phase vapors to said light phase product exit means; and conduit means for conveying said heavy phase product from said secondary separation area to said heavy phase exit means.

16. An apparatus for effecting the separation between and cooling of the light and heavy phases of the product of a coal hydrogenation process comprising: a pressure-tight outer vessel having a bottom collecting funnel, hydrogenation product inlet means positioned at the top of said vessel for admitting the product of a coal hydrogenation reaction, light phase product exit means positioned at the bottom of said vessel, heavy phase product exit means positioned at the bottom of said vessel, separate primary cooling coil fluid inlet and outlet means, and separate secondary cooling coil fluid inlet and outlet means; primary set of cooling coils positioned within and near the top of said vessel and connected to said primary cooling coil fluid inlet and outlet means; a secondary set of cooling coils positioned near the middle of said vessel and connected to said secondary cooling coil fluid inlet and outlet means; a closed separation chamber positioned within said vessel and immediately below said primary cooling coils and being so positioned that there is a first continuous annular space between said separation chamber and the interior wall of said vessel; hydrogenation product conduit means connecting with said hydrogenation product inlet means and extending down into the interior of said separation chamber for the purpose of conveying hydrogenation product into said separation chamber; a first light phase conduit means connecting with the top of said separation chamber and extending above said primary cooling coils for the purpose of conveying light phase vapors above said coils; a first heavy phase conduit means connecting with the bottom of said separation chamber and extending down below said secondary cooling coils into the lower portion of said vessel for the purpose of conveying heavy phase liquids and solids to the bottom of said vessel; second light phase conduit means connecting with said annular space between said separation chamber and said vessel and extending below said secondary cooling coils but terminating above the lower end of said first heavy phase conduit means for the purpose of conveying light phase vapors and gases to the lower portion of said vessel; a second continuous annular space below said bottom collecting funnel; a third light phase conduit means connecting with said second annular space and extending up above said lower cooling coils and terminating below said separation chamber for the purpose of conveying light phase vapors and gases down into said second annular space; a fourth light phase conduit means connecting the bottom of said second annular space with said light phase product exit means; and second heavy phase conduit means connecting the bottom of said bottom collecting funnel with said heavy phase product exit means.

17. An apparatus according to claim 16 and comprising additionally an inner shell of highly corrosion-resistant metal within said vessel, and a layer of insulation securely attached to the outside of said inner shell, said inner shell and insulation being so positioned within said vessel that a third annular space exists between said insulation and said vessel, said third annular space being unenclosed at the top of said vessel; hydrogen inlet means through the bottom of said vessel connecting with said third annular space for the purpose of continuously introducing hydrogen into said space.

18. In a vessel for hydrogen-containing materials at high temperatures and high pressures, the improvement which comprises an inner shell of high corrosion-resistant metal with a layer of insulation bonded to the outer surface thereof, said inner shell with its outer layer of insulation being so positioned within said vessel that an annular space exists between said insulation and said vessel; and hydrogen inlet means positioned at the bottom of said vessel and connecting with said annular space for the purpose of continually introducing hydrogen into said space so as to prevent other materials from accumulating in said space.

References Cited in the file of this patent

UNITED STATES PATENTS

| Number | Name | Date |
|---|---|---|
| 194,256 | McKeever | Aug. 14, 1877 |
| 1,216,334 | Lummus | Feb. 20, 1917 |
| 1,418,885 | Schulze | June 6, 1922 |
| 1,921,300 | Miller | Aug. 8, 1933 |
| 2,230,253 | Loumiet et Lavigne | Feb. 4, 1941 |
| 2,549,388 | Rivers | Apr. 17, 1951 |